May 19, 1931.   E. R. KELLY   1,805,770
AEROPLANE
Filed April 12, 1930   2 Sheets-Sheet 1

Inventor
Earl R. Kelly
By Clarence A. O'Brien
Attorney

May 19, 1931. E. R. KELLY 1,805,770
AEROPLANE
Filed April 12, 1930  2 Sheets-Sheet 2

Inventor
Earl R. Kelly
By Clarence A. O'Brien
Attorney

Patented May 19, 1931

1,805,770

UNITED STATES PATENT OFFICE

EARL RAYMOND KELLY, OF KANSAS CITY, KANSAS

AEROPLANE

Application filed April 12, 1930. Serial No. 443,771.

This invention relates broadly to aeroplanes, and has more particular reference to propelling and sustaining means for aeroplanes.

A primary feature of this invention is to provide an aeroplane having a plurality of propellers supported thereon forwardly and rearwardly of the wing of the propeller and so mounted thereon that the shaft of the propeller may be swung from a horizontal position to a vertical position and vice versa.

A still further object of the invention is to provide an aeroplane having a plurality of propellers mounted thereon, the shafts of which may be adjusted at any desired angle to the horizontal for assisting the usual or conventional drive propeller of the aeroplane as to insure a gradual descent of the aeroplane to permit of safe landing in a small field, and further to permit the take-off of the aeroplane in a small space.

With the above and numerous other objects in view, the invention consists in the novel combination, arrangement and construction of parts to be hereinafter more fully set forth and claimed.

In the drawings:

Figure 2 is a side elevational view thereof.

Figure 3 is a fragmentary detail view showing in elevation the operating lever and detent structure forming part of the invention.

Figure 4 is a detail sectional view taken substantially on the line 4—4 of Figure 1.

Figures 1, 5:
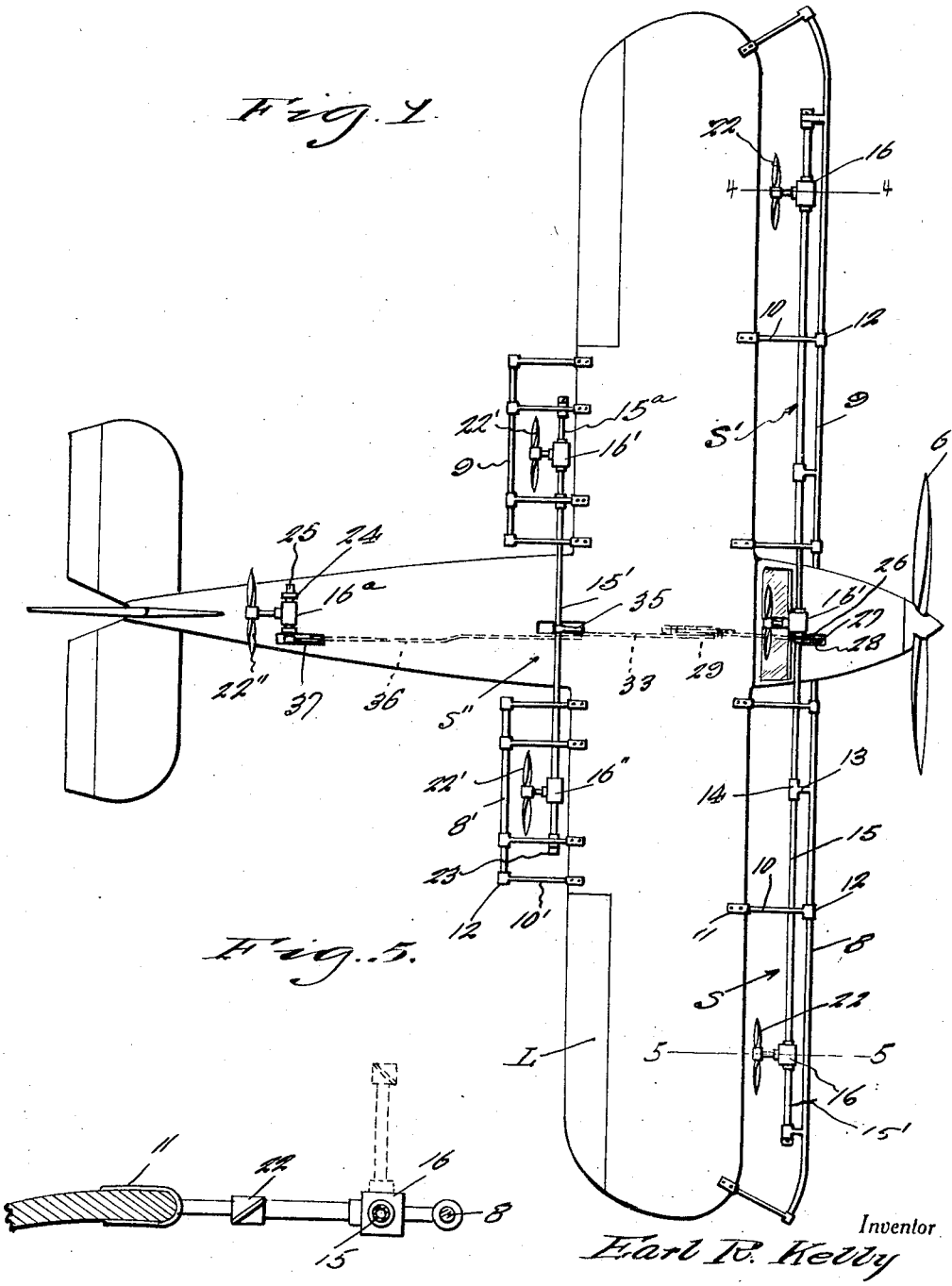
Figure 1 is a top plan view of an aeroplane embodying the features of my invention.
Figure 5 is a similar view taken substantially on the line 5—5 of Figure 1.

With reference more in detail to the drawings, it will be seen that I have designated a somewhat conventional type of monoplane by the reference character A, the same including among other parts a fuselage 5 forward propeller 6, and sustaining planes or wings 7 which extend transversely across the fuselage adjacent the forward end thereof.

As comprehended by the present invention, there is provided a frame structure forwardly of the leading edge of the wing 7 and a frame structure rearwardly of the trailing edge of the wing 7 one to each side of the fuselage and within each of these frame structures is located a propeller driven by a suitable electric motor, together with additional propellers atop the fuselage, one at the rear end and one at the forward end as clearly disclosed in the drawings and hereinafter described in detail.

Thus it will be seen that I provide a pair of bars 8 and 9 respectively extending from opposite sides of the fuselage forward of the leading edge of the aeroplane wing 7 and these bars 8 and 9 are supported through the medium of a plurality of spaced bracket arms 10.

Each of the bracket arms 10 project forwardly from the leading edge of the wing 7, and each of said arms at one end is provided with an integral fork 11 which straddles the wing 7 and is bolted or otherwise secured thereto in any suitable manner.

At their outer ends the bracket arms 10 terminate in eyes or sleeves 12 to accommodate the bars 8 and 9. Each of the bars 8 and 9 have extending inwardly therefrom bearing arms 13 terminating in bearings 14.

Journalled in the bearings 14 of the arms 13 on the respective bars 8 and 9 is a sectional shaft S and S′ respectively. Each of the shafts S and S′ include a relatively elongated hollow section 15 and a relatively short hollow section 15′. The sections of the respective shafts are joined together through the medium of a motor housing 16 while the adjacent ends of the sections 15 of the respective shafts are joined together through the medium of a motor housing 16′.

The motor housings 16 and 16′ are substantially identical in construction being substantially rectangular and on one side provided with a tubular extension 17 for receiving one end of one of the shaft sections and a similar tubular extension 18 on the opposite side for receiving one end of the other of the sections, set screws 19 being utilized for retaining the ends of the sections in the extensions.

The shafts S and S′ are rockable in their respective bearings and thus it will be seen that there is located a motor housing 16 one adjacent each end of the wing 7 while the motor housing 16′ is disposed atop the fuselage 5.

Arranged in each of the motor housings 5 is an electric motor M the shaft 21 of which extends through the housing and a propeller 22 is mounted on the free end of the shaft.

Thus it will be seen that by rocking the shafts S and S′ simultaneously in a manner to be hereinafter more fully set forth, the shaft 21 may be moved from a horizontal position to a vertical position as clearly suggested in Figure 5, or as is evident, from a vertical to a horizontal position.

At the trailing edge of the aeroplane wing 7 on opposite sides of the fuselage inwardly from the ailerons L of the wing, the structure is somewhat duplicated, there being provided on each side of the fuselage and extending forwardly therefrom a plurality of brace or bracket arms 10′ identical in construction to the bracket arms 10 and the bracket arms 10′ on each side of the fuselage support in their outer sleeves 12′ a frame bar 8′ and 9′ respectively.

Certain of the brackets 10′ on opposite sides of the fuselage are provided with suitable bearings 23 and journaled in these bearings and extending transversely of the fuselage is a shaft S″. The shaft S″ comprises an elongated section 15″ and two end sections 15a. The end sections are joined to the elongated intermediate section 15″ through the medium of a motor housing 16″, there being one motor housing 16″ on each side of the fuselage.

The motor housing 16″ is identical as the motor housing 16 and 16′ and the shaft sections 15′ and 16′ are joined to these motor housings 16″ in the same manner as the shaft sections 15 and 16 so that a more detailed description is thought unnecessary.

Mounted on the top of the fuselage at the rear thereof is a pair of upstanding bearing brackets 24 having journalled therein shaft sections 25 coupled to a motor housing 16a for rockably supporting the motor housing 16a between said bearing brackets.

Each of the motor housing 16″ and 16a have of course an electric motor arranged therein, a shaft extending from the housing through the motor and a propeller on the outer end of the shaft and for the sake of convenience I have designated the propellers, operated from the motors in the housings 16″ by the reference character 22′ and the propeller operated from the motor in the housing 16a by the reference character 22″.

For simultaneously operating or rocking all of the rock shafts for raising the shafts of the respective propellers from a horizontal to a vertical position or vice versa, I provide for the coupled shafts S and S′ adjacent the motor housing 16′ a rocker arm 26 operatively connected with a link 27 extending downwardly through a suitable opening 28 in the top of the fuselage, and the link is pivoted to a control lever 29 pivoted as at 30 to a fixed rack segment 31, the lever 29 being provided with a suitable detent structure 32 co-operating with the rack segment for retaining the lever 29 in a predetermined adjusted position.

The link 27 together with a link 33 is pivoted as at 34 to the lever 24 and this link 33 at its free end is pivoted to one end of a crank arm 35 carried by the section 15′ of the rock shaft S″, which crank arm 35 is in turn operatively connected through the medium of a link 36 to a crank arm 37 carried by the rock shaft 25.

Thus it will be seen that all of the rock shafts may be simultaneously rocked for placing the propellers either in a horizontal or vertical position or any angle with respect to the horizontal.

From the foregoing it will be apparent that the propellers in a vertical position will provide a gradual descent of the aeroplane and will permit of safe landing in small space. By adjusting the angle of the propeller shafts the aeroplane will also be assisted and rendered capable of taking off in a small space, these auxiliary propellers assisting the forward propeller of the aeroplane.

The auxiliary propellers will also be found useful in preventing nose dives, tailspins and to safely extricate itself from air pockets.

Of course, it is to be understood that in the event of motor trouble, there may be utilized storage electricity for providing sufficient power at all times to operate the propellers whereby a gradual descent and safe landing may be accomplished, and whereby there will be sufficient power at all times when about to take off or in landing.

Of course, gradual descent is obtained by gradually reducing the speed of the auxiliary propellers.

It is thought that from the foregoing description, taken in connection with the accompanying drawings, a clear understanding of the operation, construction, utility and advantages of a construction of this character will be had by those skilled in the art without a more detailed description.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:

1. An aeroplane including in combination a fuselage, a transverse sustaining wing, a frame supported adjacent the leading edge of said wing on opposite sides of said fuselage, a rock shaft mounted in each of said frames, a housing carried by each of said rock shafts, a housing operatively connecting said rock shaft, a frame supported adjacent the trailing edge of said wing on opposite sides of said fuselage, a housing rockably mounted in each of said last mentioned frames, a rock shaft operatively connecting said last mentioned housing, a motor mounted in each of said housings, and having a drive shaft extending through the housing, a propeller carried by said drive shaft, and means for simultaneously rocking all of said rock shafts.

2. An aeroplane including in combination a fuselage, a transverse sustaining wing, frames supported adjacent the leading edge of said wing on opposite sides of said fuselage, a rock shaft mounted in each of said frames, a housing carried by each of said rock shafts, a housing operatively connecting said rock shafts, frames supported adjacent the trailing edge of said wing on opposite sides of said fuselage, a housing rockably mounted in each of said last mentioned frames, a rock shaft operatively connecting said last mentioned housing, a motor mounted in each of said housings, and having a drive shaft extending through the housing, a propeller carried by said drive shaft, and means for simultaneously rocking all of said rock shafts, and manually controlled means for retaining all of said rock shafts in a predetermined rocked position, and the axis of said drive shaft being at right angles to the axis of said rock shaft.

3. An aeroplane comprising in combination, a fuselage, a transverse sustaining wing, frames supported on said wing adjacent the leading and trailing edges respectively of said wing on opposite sides of said fuselage, a housing rockably mounted in each frame supported adjacent the trailing edge of said wing, a rock shaft operatively connecting said housing, a rock shaft mounted in each frame at the leading edge of said wing, a housing carried by each of the last mentioned rock shafts, a housing connecting said last rock shaft, a shaft rockably mounted on said fuselage adjacent the rear end thereof, the housing carried by said last mentioned shaft, a motor arranged in each of said housings and having a drive shaft extending through the housing, a propeller on said drive shaft, and manual means for simultaneously rocking all of said rock shafts.

4. In an aeroplane, a pair of alined rockably mounted shafts having their axis at right angles to the axis of the aeroplane, a housing carried by each of said shafts, a housing connecting said shafts, a motor in each of said housings having a drive shaft extending through the housing, a propeller on said drive shaft exteriorly of said housing, and means for rocking said rotatably mounted shafts.

In testimony whereof I affix my signature.

EARL RAYMOND KELLY.